(12) United States Patent
Kim et al.

(10) Patent No.: US 10,333,452 B2
(45) Date of Patent: Jun. 25, 2019

(54) CONTROL APPARATUS AND METHOD FOR SENSING OVERCURRENT OF DC MOTOR OF VEHICLE

(71) Applicants: HYUNDAI MOTOR COMPANY, Seoul (KR); KIA MOTORS CORPORATION, Seoul (KR)

(72) Inventors: Sun Woo Kim, Seoul (KR); Sae Rom Kim, Bucheon-si (KR); Sang Hyun Jang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/722,750

(22) Filed: Oct. 2, 2017

(65) Prior Publication Data

US 2018/0287547 A1 Oct. 4, 2018

(30) Foreign Application Priority Data

Apr. 4, 2017 (KR) ........................ 10-2017-0043819

(51) Int. Cl.
*G05B 11/28* (2006.01)
*H02P 29/032* (2016.01)
(Continued)

(52) U.S. Cl.
CPC .............. *H02P 29/032* (2016.02); *H02P 3/08* (2013.01); *H02P 7/29* (2013.01); *H02P 29/027* (2013.01); *H02P 2205/01* (2013.01)

(58) Field of Classification Search
CPC ...... H02P 1/00; H02P 3/00; H02P 3/08; H02P 1/46; H02P 3/18; H02P 7/00; H02P 7/06; H02P 7/29; H02P 7/295; H02P 8/24; H02P 27/08; H02P 6/00; H02P 6/06; H02P 6/12; H02P 6/14; G05B 11/28; H02H 7/09
(Continued)

(56) References Cited

U.S. PATENT DOCUMENTS 7,239,097 B2 * 7/2007 Hashimoto ............... H02P 4/00
318/400.08
8,188,696 B2 5/2012 Shimizu
(Continued)

FOREIGN PATENT DOCUMENTS

JP 2006-518980 8/2006
JP 2010-263776 11/2010
(Continued)

*Primary Examiner* — Antony M Paul
(74) *Attorney, Agent, or Firm* — Brinks Gilson & Lione

(57) ABSTRACT

The present disclosure provides a control apparatus for sensing overcurrent of a DC motor of a vehicle. The control apparatus may include: a microcomputer configured to convert a pulse width modulation (PWM) signal into a digital signal for controlling the DC motor; a half-bridge driver configured to control switching of the DC motor; a regulator configured to supply power; and a noise removal filter. The microcomputer is configured to measure a voltage at an input of the half-bridge driver, compare a difference between on-voltage and off-voltage during each of PWM period with a predetermined threshold, and stop the DC motor when the difference exceeds the predetermined threshold a predetermined number of times.

20 Claims, 4 Drawing Sheets

(51) Int. Cl.
*H02P 3/08* (2006.01)
*H02P 7/29* (2016.01)
*H02P 29/024* (2016.01)

(58) Field of Classification Search
USPC .......... 318/101, 678, 679, 680, 135, 400.26,
318/400.27, 400.28, 400.29, 400.06,
318/400.07, 400.22, 762, 778, 779, 783,
318/599, 811, 803, 799, 800, 280, 286,
318/430, 432, 434; 361/5, 23, 30, 90,
361/91.1, 91.2
See application file for complete search history.

(56) References Cited

U.S. PATENT DOCUMENTS

| 9,331,616 B2* | 5/2016 | Swanson .................... H02P 7/00 |
| 2009/0284193 A1 | 11/2009 | Hoogzaad |
| 2011/0044669 A1 | 2/2011 | Leon |

FOREIGN PATENT DOCUMENTS

| KR | 10-2009-0084431 | 8/2009 |
| KR | 10-1272595 B | 6/2013 |
| KR | 10-1637609 B | 7/2016 |

* cited by examiner

FIG. 1 "Prior Art"
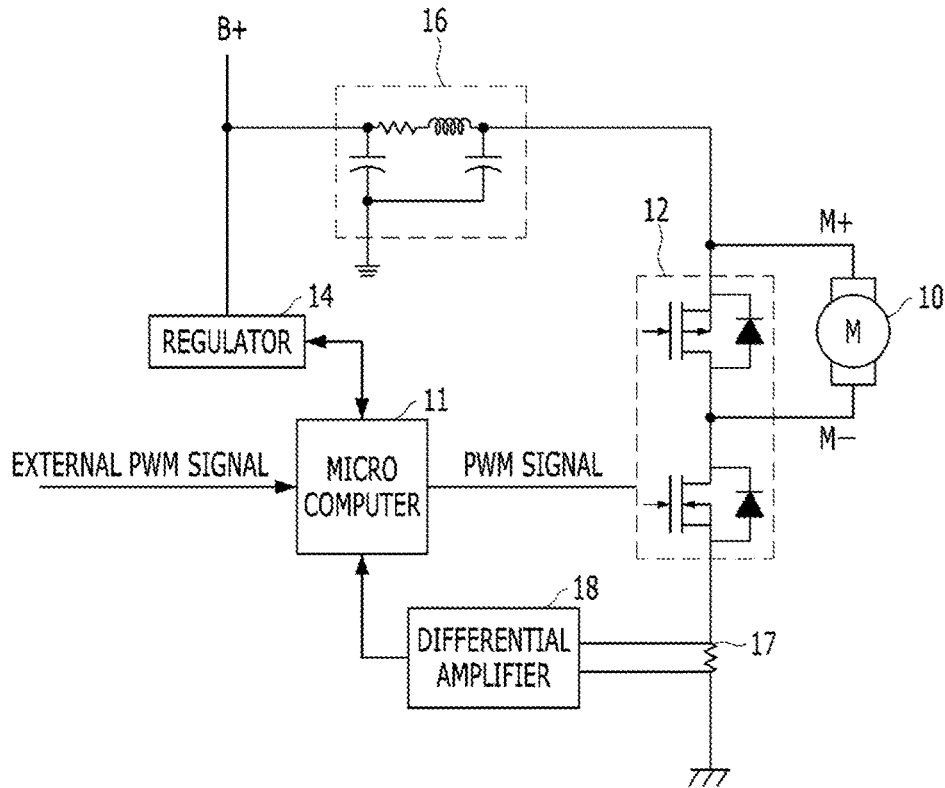
FIG. 2
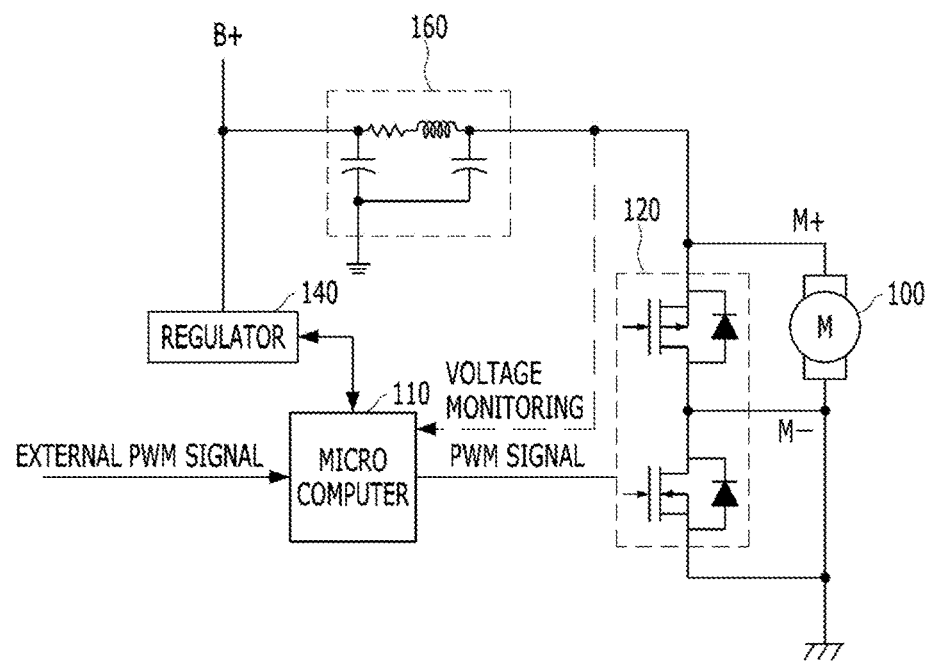

CONTROL APPARATUS AND METHOD FOR SENSING OVERCURRENT OF DC MOTOR OF VEHICLE

CROSS-REFERENCE TO RELATED APPLICATION

The present application claims priority to and the benefit of Korean Patent Application No. 10-2017-0043819, filed on Apr. 4, 2017, which is incorporated herein by reference in its entirety.

FIELD

The present disclosure relates to a control apparatus and method for sensing overcurrent of a DC motor of a vehicle, which are capable of stopping operation of the DC motor to protect a system if overcurrent flowing in the DC motor is detected.

BACKGROUND

The statements in this section merely provide background information related to the present disclosure and may not constitute prior art.

In general, a pulse width modulation (PWM) method is a pulse modulation method and refers to a method of changing the width of a pulse according to the level of a modulation signal and performing modulation. The width of the pulse increases when the amplitude of a signal is large and decreases when the amplitude of the signal is small. However, the location or amplitude of the pulse is not changed. The PWM signal may control the speed of the DC motor, that is, current. The speed of the DC motor may be controlled using a variable resistor. In this case, if only about 50% of electricity of a battery is controlled and supplied to the motor, the remaining electricity of about 50% is consumed as heat loss of a resistor. Therefore, a PWM control method is preferred.

A PWM control method, more particularly, a half-bridge control method has a low power loss (several tens of Watts) and good efficiency as compared to an existing linear control method and thus may improve fuel efficiency of a vehicle. For this reason, recently, the control method of the DC motor has gradually changed to a half-bridge control method.

In PWM control, a duty ratio of a predetermined time T1 when a switch is turned on to a predetermined time T2 when the switch is turned off is controlled. The time T1 is controlled based on the voltage of an external source in a range from 0 to 100%.

In this manner, if power is supplied to the motor by variable percentage while current flowing in the DC motor is periodically changed, power of 100% is instantaneously supplied to the motor. However, since a frequency is about 20 kHz, one period is very short and thus a response speed of the motor has certain limits.

Since output corresponding to an average of T1 is constant and only the electronic switch is repeatedly turned on/off, the speed of the motor can be controlled. Specifically, it will cause only heat loss of an internal resistor of a semiconductor without heat loss of a variable resistor. Accordingly, control efficiency of a microcomputer becomes 95% or greater.

However, in controlling the current of the motor, since a DC motor uses high current, overcurrent of a reference value may flow to destroy a system when short-circuit or stall occurs. In the worst case, the winding of the motor is overheated due to overcurrent, thereby causing a fire.

In the related art, a DC motor controller of a vehicle is configured as shown in FIG. 1. A PWM control module shown in FIG. 1 includes a microcomputer 11 for converting a PWM signal received from an external controller into a digital signal for controlling a DC motor, a half bridge 12 including two FETs to control switching of the DC motor 10, a shunt resistor 17 for measuring the amount of current of the DC motor 10, a differential amplifier 18 for amplifying the amount of current and a regulator 14 for performing a reset operation when an error occurs in the microcomputer 11.

The PWM signal received from the external controller and converted into the signal sensible by the microcomputer is inputted to the microcomputer 11. The microcomputer 11 converts the converted PWM input signal into the digital signal for controlling the DC motor 10.

This digital signal is converted into a signal having a voltage value and a current value for driving the half bridge 12. A pair of FETs drives the DC motor 10 in one direction.

The shunt resistor 17 is used to compare an input PWM duty cycle and an output PWM duty cycle using the amount of current flowing in the motor 10. If a difference between the input duty cycle and the output duty cycle is greater than a predetermined threshold, a problem may occur in the microcomputer 11 or the DC motor may stall. If the DC motor 10 stalls, the microcomputer 11 detects stall and sets the duty cycle to 0% to prevent a fire from being caused in the DC motor 10.

However, the resistance value of the shunt resistor 17 used in the PWM control module in order to reduce influence on the driving current of the motor is very small and a resistor having a very small error rate should be used in order to reduce an error of a current measurement value. In addition, even when a resistance value is small, current of 10 to 20 ampere generally flows, a resistance element of several watts should be used.

In addition, since a voltage applied to the resistor is significantly small, a voltage difference across the resistor is as small as several tens of mV. Accordingly, the differential amplifier 18 capable of amplifying the voltage to several tens of times or more is used to amplify the voltage to a value detectable by the microcomputer 11.

However, since the differential amplifier and the comparator should be used to detect overcurrent of the DC motor, delay of the differential amplifier according to frequency and change in circuit constant of the comparator circuit may occur. Therefore, the circuit becomes complicated and costs may increase.

SUMMARY

The present disclosure provides a control apparatus and method for sensing overcurrent of a DC motor of a vehicle, which are capable of stopping operation of the DC motor to protect a system if overcurrent flowing in the DC motor is detected.

The present disclosure also provides a control apparatus and method for sensing overcurrent of a DC motor of a vehicle, which are capable of simplifying a circuit and decreasing costs by detecting overcurrent of the DC motor without a differential amplifier and a comparator.

A control apparatus for sensing overcurrent of a DC motor of a vehicle may include: a microcomputer configured to convert a pulse width modulation (PWM) signal into a digital signal for controlling the DC motor; a half-bridge driver configured to control switching of the DC motor; a regulator configured to supply power; and a noise removal filter. The microcomputer is configured to measure a voltage at an input of the half-bridge driver; compare a difference between an on-voltage and an off-voltage during each of PWM period with a predetermined threshold, and stop the DC motor when the difference exceeds the predetermined threshold more than a predetermined number of times.

The half-bridge driver may include a high-side FET and a low-side FET.

A voltage between the noise removal filter and an input unit of the half-bridge driver may be measured as the voltage at the input of the half-bridge driver.

The microcomputer may measure the voltage at an input of the half-bridge driver with an internal AD converter.

The microcomputer may measure a drain voltage in a turn-on period and a turn-off period of the high-side FET.

A counter of the memory counts the predetermined number of times.

The counter of the memory may be increased by 1 when the difference between the voltages is greater than the predetermined threshold and decreased by 1 when the difference between the voltages is less than the predetermined threshold.

The AD converter of the microcomputer may measure at each midpoint of the turn-on period and the turn-off period of the high-side FET.

The microcomputer may be configured to convert the PWM signal received from an external controller into the digital signal.

The predetermined threshold may be set based on an on-duty condition of the high-side FET.

The microcomputer may be configured to turn the FET of the half-bridge driver off after stopping the DC motor.

The predetermined number of times may be 1,000 times.

In another aspect of the present disclosure, a control method of sensing overcurrent of a DC motor of a vehicle using a half-bridge driver may include: measuring a drain voltage in a turn-on period and a turn-off period of a high-side FET; measuring a difference between the drain voltages measured in the turn-on period and the turn-off period; comparing the difference between the drain voltages with a predetermined threshold; counting a number of times that the difference is greater than the predetermined threshold; and stopping the DC motor when the counted number exceeds a predetermined number of times.

A counter of a memory may perform the counting.

When the difference is greater than the predetermined threshold, the control method may increase the counter of the memory by 1; and when the difference is less than the predetermined threshold, the method may decrease the counter of the memory by 1.

An internal AD converter of a microcomputer may measure the drain voltage.

The control method may further include setting a measurement time of the AD converter of the microcomputer to each midpoint of a turn-on period and a turn-off period of the high-side FET.

The control method may further include setting the predetermined threshold based on an on-duty condition of the high-side FET.

The control method may further include turning the FET of the half-bridge driver off after stopping the DC motor of the vehicle.

The control method may further include setting the predetermined number of times as 1,000 times.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram showing a half-bridge type motor control apparatus of the related art;

FIG. 2 is a schematic diagram showing a control apparatus for sensing overcurrent of a DC motor of a vehicle;

Figure 3:
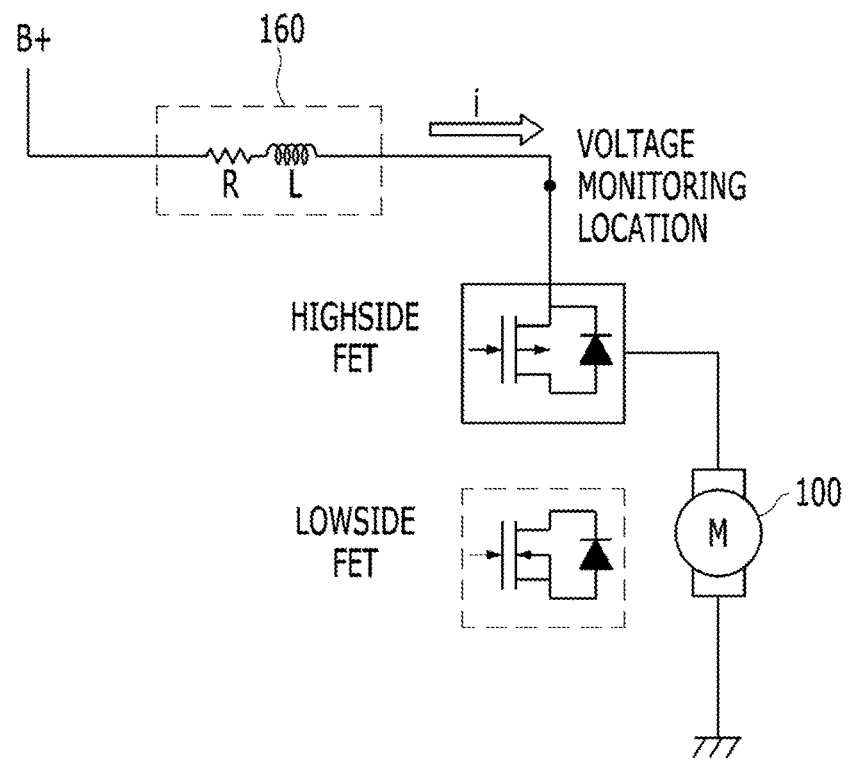
FIG. 3 is a diagram showing an equivalent circuit when a high-side FET is turned on in a half-bridge driver shown in FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A control apparatus for sensing overcurrent of a DC motor of a vehicle in some forms of the present disclosure shown in FIG. 2 includes a microcomputer 110 for converting a PWM signal received from an external controller into a digital signal for controlling a DC motor, a half-bridge driver 120 including a high-side FET and a low-side FET to control switching of the DC motor 100, a regulator 140 for supplying power and a noise removal filter 160.

In some forms of the present disclosure, the shunt resistor is removed and the negative (−) terminal of the motor 100 and the half-bridge driver 120 are directly connected to the ground, as compared to the controller of the related art. In addition, since the voltage across the shunt resistor does not need to be amplified, the differential amplifier is removed.

Instead of the shunt resistor for measuring the amount of current of the DC motor 100 in the related art, the microcomputer 110 measures the voltage of the drain node of the high-side FET between the two FETs configuring the half-bridge driver 120 using an internal AD converter.

Figure 5:
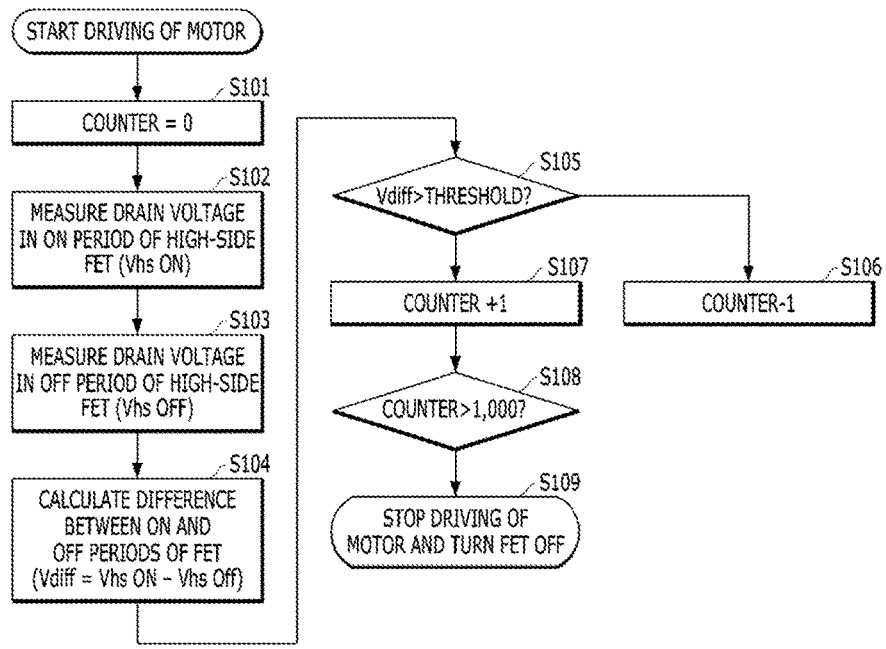
FIG. 5 is a flowchart illustrating a control method of sensing overcurrent of a DC motor of a vehicle.

That is, a voltage measurement point is located between the output unit of the noise removal filter 160 and the input unit of the half-bridge driver 120. The control method using the control apparatus for sensing overcurrent of the DC motor will now be described with reference to FIG. 5.

First, if a user uses a small motor in a vehicle, the motor 100 is driven. At this time, a counter variable has 0 as an initial value in an internal memory (S101).

Thereafter, in a period within which the high-side FET for directly supplying current to the motor 100 is turned on, the drain voltage of the high-side FET is measured by the AD converter of the microcomputer 110 (S102). In a period in which the FET is turned off, the drain voltage is measured again (S103).

FIG. 3 shows an equivalent circuit when the high-side FET is turned on in the half-bridge driver shown in FIG. 2. A voltage of a voltage monitoring point should be equal to a voltage of a battery. However, if the amount of current is large, the voltage slightly decreases due to an internal resistor R and an inductor component L of an inductor included in a filter. Accordingly, the voltage value in the period in which the high-side FET of the half-bridge driver is turned on to supply current to the motor is defined as the following equation.

$$V_m = V_B - (R \times i) - \left(L\frac{di}{dt}\right)$$

Here, when the motor stalls or when overcurrent is generated, since the amount i of current flowing in the motor is large, the voltage value Vm of the voltage monitoring point is lower than that of a normal state.

Figure 4:
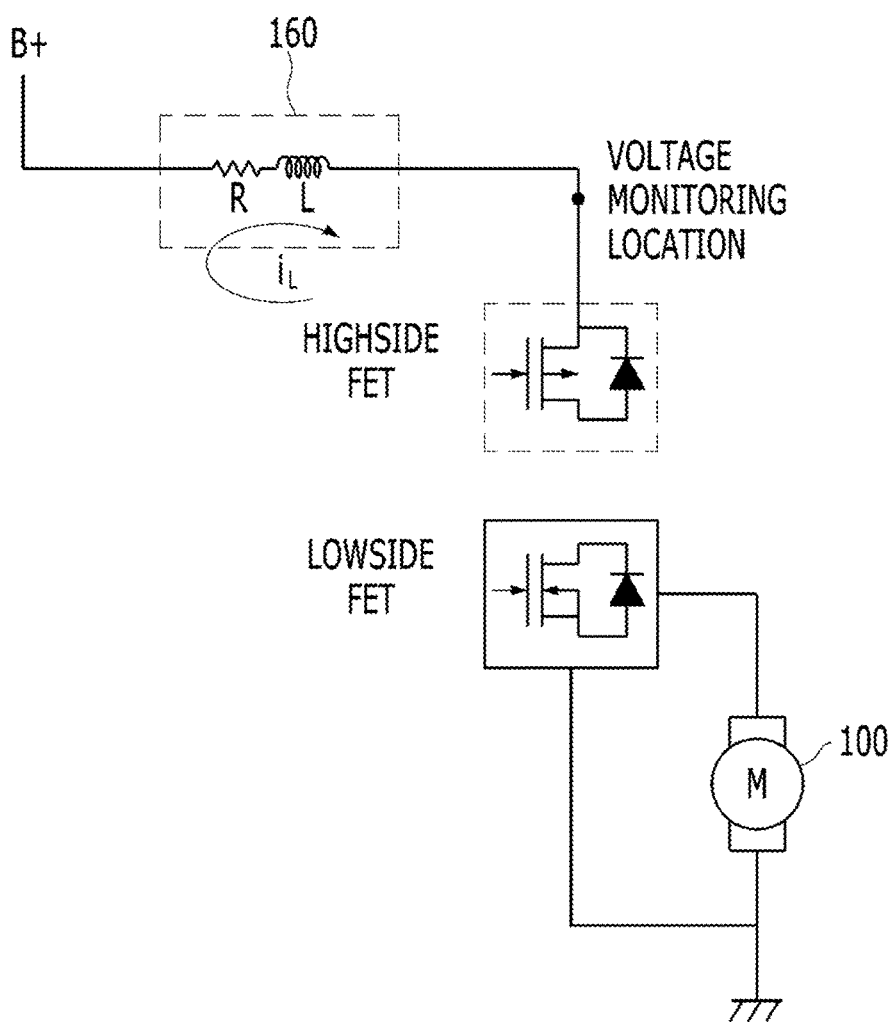
FIG. 4 is a diagram showing an equivalent circuit when a high-side FET is turned off in a half-bridge driver shown in FIG. 2.

FIG. 4 is a diagram showing an equivalent circuit when the high-side FET is turned off in the half-bridge driver shown in FIG. 2.

Here, the low-side FET is turned on such that energy stored in the motor flows back through the low-side FET.

The voltage of the voltage monitoring point is defined as the following equation due to energy stored in the inductor L and the voltage of the battery.

$$V_m = V_B + (R \times i_L) + \left(L\frac{di_L}{dt}\right)$$

Figure 6:
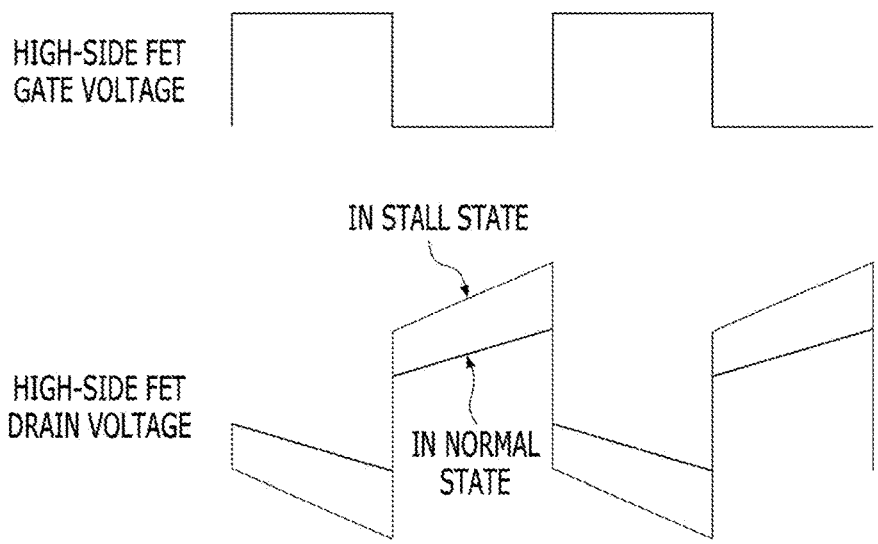
FIG. 6 is a diagram showing the waveform of a high-side FET gate voltage and a high-side FET drain voltage in a normal state and in a stall state.

In accordance with the above two equations, the voltage of the voltage monitoring point in a normal state is different from that in a stall state as shown in FIG. 6.

In one PWM period, the drain voltages measured when the high-side FET is turned on and off are different according to the amount of current flowing in the motor. Accordingly, a difference between the on and off voltages measured per period is compared with a predetermined threshold (S105). When the difference is greater than the threshold, the counter of the memory is increased by 1 (S107) and, otherwise, the counter of the memory is decreased by 1 (S106).

If the measured value is continuously greater than the threshold predetermined times (e.g., 1,000 times) (S108), it may be determined that overcurrent flows. By determining that overcurrent flows based on the results of performing comparison for a predetermined number of times, it is possible to correct an erroneous measurement result due to motor noise.

The predetermined threshold should be set based on the on-duty cycle of the high-side FET at a measurement time. Since the amount of current passing through the FET is changed according to the duty cycle, the on-duty cycle at a current measurement time should be checked and a threshold suitable for each duty condition should be set, because normal current of a high duty cycle may be similar to stall current at a low duty cycle. Accordingly, the threshold suitable for the duty cycle should be determined in consideration of the properties of the used motor and the resistance component value of the used filter.

Even when a voltage is applied to the gate of the FET, a channel is linearly formed between the drain and the source according to charge and discharge. Because of this, flow of current linearly increases and decreases and the voltage measured at the drain linearly varies in the on/off period.

Accordingly, in order to reduce a difference generated due to voltage measurement time, the measurement sampling time of the AD converter is set to a midpoint of the on/off period to select an intermediate value.

If overcurrent or stall occurs, the driving of the motor is stopped and the FET is turned off.

In some forms of the present disclosure, it is possible to remove a shunt resistor and a differential amplifier used in the conventional control apparatus, thereby reducing costs.

In other forms of the present disclosure, the lock state of the motor can be relatively accurately detected even in the initial driving state of the DC motor and voltage drop cannot occur between the DC motor and the ground by a shunt resistor. Accordingly, it is possible to suppress electromagnetic noise.

In addition, since the number of elements decreases, the size of the controller can be smaller and reliability can be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control apparatus for sensing overcurrent of a DC motor of a vehicle, the control apparatus comprising:
    a microcomputer configured to convert a pulse width modulation (PWM) signal into a digital signal for controlling the DC motor;
    a half-bridge driver configured to control switching of the DC motor;
    a regulator configured to supply power; and
    a noise removal filter,
    wherein the microcomputer is further configured to:
        measure a voltage at an input of the half-bridge driver;
        compare a difference between an on-voltage and an off-voltage during each of PWM period with a predetermined threshold; and
        when the difference exceeds the predetermined threshold more than a predetermined number of times, stop the DC motor.

2. The control apparatus according to claim 1, wherein the half-bridge driver comprises a high-side FET and a low-side FET.

3. The control apparatus according to claim 2, wherein the predetermined threshold is set based on an on-duty condition of the high-side FET.

4. The control apparatus according to claim 1, wherein a voltage between the noise removal filter and an input unit of the half-bridge driver is measured as the voltage at the input of the half-bridge driver.

5. The control apparatus according to claim 1, wherein, with an internal AD converter, the microcomputer measures the voltage.

6. The control apparatus according to claim 5, wherein the AD converter of the microcomputer measures at each midpoint of the turn-on period and the turn-off period of the high-side FET.

7. The control apparatus according to claim 1, wherein the microcomputer measures a drain voltage in a turn-on period and a turn-off period of the high-side FET.

8. The control apparatus according to claim 1, wherein a counter of the memory counts the predetermined number of times.

9. The control apparatus according to claim 8, wherein
when the difference is greater than the predetermined threshold, the counter of the memory is increased by 1; and
when the difference is less than the predetermined threshold, the counter of the memory is decreased by 1.

10. The control apparatus according to claim 1, wherein the microcomputer is configured to convert the PWM signal received from an external controller into the digital signal.

11. The control apparatus according to claim 1, wherein the microcomputer is configured to turn the FET of the half-bridge driver off after stopping the DC motor.

12. The control apparatus according to claim 1, wherein the predetermined number of times is 1,000 times.

13. A control method of sensing overcurrent of a DC motor of a vehicle using a half-bridge driver, the control method comprising:
measuring a drain voltage in a turn-on period and a turn-off period of a high-side FET;
measuring a difference between the drain voltages measured in the turn-on period and the turn-off period;
comparing the difference between the drain voltages with a predetermined threshold;
counting a number of times that the difference is greater than the predetermined threshold; and
when the counted number exceeds a predetermined number of times, stopping the DC motor.

14. The control method according to claim 13, wherein a counter of a memory performs the counting.

15. The control method according to claim 14, wherein, when the difference is greater than the predetermined threshold, increasing the counter of the memory by 1; and
when the difference is less than the predetermined threshold, decreasing the counter of the memory by 1.

16. The control method according to claim 13, wherein, an internal AD converter of a microcomputer measures the drain voltage.

17. The control method according to claim 16, further comprising:
setting a measurement time of the AD converter of the microcomputer to each midpoint of a turn-on period and a turn-off period of the high-side FET.

18. The control method according to claim 13, further comprising:
setting the predetermined threshold based on an on-duty condition of the high-side FET.

19. The control method according to claim 13, further comprising:
turning the FET of the half-bridge driver off after stopping the DC motor.

20. The control method according to claim 13, further comprising:
setting the predetermined number of times as 1,000 times.

* * * * *